United States Patent
Ernst et al.

(10) Patent No.: US 11,163,900 B2
(45) Date of Patent: Nov. 2, 2021

(54) DATA PROCESSING MEANS AND METHOD FOR OPERATING THE SAME

(71) Applicant: Uniscon Universal Identity Control GmbH, Munich (DE)

(72) Inventors: Edmund Ernst, Munich (DE); Franz Stark, Munich (DE); Hubert Jäger, Pullach (DE); Arnold Monitzer, Markt Indersdorf (DE)

(73) Assignee: UNISCON UNIVERSAL IDENTITY CONTROL GMBH, Munich (DE)

( * ) Notice: Subject to any disclaimer, the term of this patent is extended or adjusted under 35 U.S.C. 154(b) by 336 days.

(21) Appl. No.: 15/852,327

(22) Filed: Dec. 22, 2017

(65) Prior Publication Data

US 2018/0121674 A1    May 3, 2018

Related U.S. Application Data

(63) Continuation of application No. PCT/EP2016/064657, filed on Jun. 24, 2016.

(30) Foreign Application Priority Data

Jun. 24, 2015  (DE) ............. 10 2015 110 190.4

(51) Int. Cl.
*G06F 21/62* (2013.01)
*H04L 29/08* (2006.01)
(Continued)

(52) U.S. Cl.
CPC .......... *G06F 21/6218* (2013.01); *G06F 21/71* (2013.01); *G06F 21/86* (2013.01);
(Continued)

(58) Field of Classification Search
CPC ...... G06F 21/6218; G06F 21/71; G06F 21/86; G06F 21/81; H04L 63/02; H04L 63/0428;
(Continued)

(56) References Cited

U.S. PATENT DOCUMENTS

2002/0147924 A1* 10/2002 Flyntz ................ G06F 21/32
726/4
2005/0039040 A1   2/2005 Ransom et al.
(Continued)

FOREIGN PATENT DOCUMENTS

| DE | 10133184 A1 | 1/2003 |
| EP | 2533172 A1 | 12/2012 |
| WO | 2007076840 A1 | 7/2007 |

OTHER PUBLICATIONS

International Search Report, dated Aug. 29, 2016, for corresponding International Application No. PCT/EP2016/064657.
International Preliminary Report on Patentability, dated Dec. 26, 2017, for corresponding International Application No. PCT/EP2016/064657.

*Primary Examiner* — Alexander Lagor
*Assistant Examiner* — Forrest L Carey
(74) *Attorney, Agent, or Firm* — Myers Wolin, LLC

(57) ABSTRACT

A system for reliable data processing is provided, wherein the system is implemented in a sealed infrastructure, wherein the sealed infrastructure comprises at least one processing area and a storage area, wherein the network area, the processing area, and the storage area are separated from each other physically, wherein the processing area is adapted to receive data from the storage area and/or from the network area in encrypted form, to decrypt to process the received data, and to transmit the processed data in encrypted form to the storage area and/or to the network area. Further, a method for reliable processing of data in a system according to the invention is provided.

8 Claims, 4 Drawing Sheets

(51) Int. Cl.
    *G06F 21/86*    (2013.01)
    *H04L 29/06*    (2006.01)
    *G06F 21/71*    (2013.01)

(52) U.S. Cl.
    CPC .......... *H04L 63/02* (2013.01); *H04L 63/0209* (2013.01); *H04L 63/0227* (2013.01); *H04L 63/0428* (2013.01); *H04L 63/06* (2013.01); *H04L 63/10* (2013.01); *H04L 67/1097* (2013.01)

(58) Field of Classification Search
    CPC ..... H04L 63/06; H04L 63/10; H04L 67/1097; H04L 63/0209; H04L 63/0227
    See application file for complete search history.

(56) References Cited

U.S. PATENT DOCUMENTS

| | | | |
|---|---|---|---|
| 2006/0225142 A1 | 10/2006 | Moon | |
| 2009/0254791 A1 | 10/2009 | Jurneke | |
| 2012/0260090 A1* | 10/2012 | Hauck | H04L 63/0853 713/168 |
| 2012/0311690 A1* | 12/2012 | Ellis | G06F 21/50 726/11 |
| 2014/0241523 A1* | 8/2014 | Kobres | G06F 21/71 380/28 |
| 2016/0063040 A1* | 3/2016 | Kraemer | G06F 16/213 707/668 |

\* cited by examiner

DATA PROCESSING MEANS AND METHOD FOR OPERATING THE SAME

CROSS REFERENCE TO RELATED APPLICATIONS

This application is a continuation of International Application No. PCT/EP2016/064657, filed on Jun. 24, 2016, which claims priority to German Application No. 10 2015 110 190.4, filed Jun. 24, 2015, the contents of each of which are incorporated by reference herein.

TECHNICAL FIELD

The invention relates to a data processing means and a method for operating a data processing means, in particular, for reliable operation of a data processing means.

BACKGROUND

Ensuring confidentiality of data which is processed in a data processing system poses, besides the requirements concerning the availability of the system and the integrity of the data, a substantial challenge to the system. In particular, in the environment of Cloud Computing, in most cases, there exists a justified concern that data might be misused, for many potential users being a reason for waiving this solution.

With respect to currently available data processing systems, frequently, data which partly is highly sensible, falls into wrong hands. Hereby, the following categories of threat can be distinguished:
attacks from "outside" by unauthorized physical accesses;
attacks from "outside" by hacker attacks; and
attacks from "inside", for example, by the provider of the data processing system, by the software services used, by developers of the hardware and/or soft-ware components.

In order to prevent attacks from "outside", usually, technical methods are used, for example, special access systems, which restrict or prevent an unauthorized access or admission to systems, in which sensible data is processed. By consequently using firewalls, password procedures, etc., attacks from "outside" may be additionally prevented.

While attacks from "outside" can be prevented comparatively well, attacks from "inside" cannot be handled by currently used data processing systems, or only with substantial effort, because persons are involved, who have to obtain access to these systems due to their task (for example, during maintenance and operation of the systems), or who basically would be able to manipulate these due to their role during realization of access control systems. Thus, the shortcoming here is the "human" factor, because it basically is possible that data is misused by intentional or negligent action of the acting persons. Necessarily, from this it follows that technical methods always have to be coupled to organizational measures (for example, taking particular care with respect to the selection of the staff, dual control principle, etc.) in order to be efficient, wherein inherently organizational measures have a substantially lower effect. Criminal or erroneous acts of the persons involved, blackmail, and corruption may never be excluded, and therefore, always constitute a latent threat for ensuring data confidentiality.

FIG. 1 shows a data processing system known from prior art. The data processing system may be physically protected from non-authorized access, for example, by means of access control. The communication with external systems, as a client, may be executed by using an encryption and decryption means EU, wherein the data to be transmitted may be encrypted itself. The access to the data processing system from outside may be protected by means of a firewall.

However, the provider (e.g., the employees of the provider) has access to the data processing system internally, such that the provider potentially is able to misuse all data.

SUMMARY

Therefore, it is an object of the present invention to provide solutions according to which a high degree of data confidentiality may be ensured due to technical measures, and organizational measures may be omitted to a large extent.

Accordingly, a system for reliable data processing is provided, wherein the system is implemented in a sealed infrastructure, wherein the sealed infrastructure comprises:
a network area, at least one processing area, and a storage area, wherein the network area, the processing area, and the storage area are separated from each other physically, wherein
the network area and the processing area as well as
the processing area and the storage area respectively are coupled to each other via an internal communications network, and
an access control which is adapted to monitor and to control access to the net-work area, the processing area, and the storage area, and to prevent access to unencrypted data, and wherein
the network area is adapted to process a communication between the system and an external system (client) via a communications network, wherein the network area is further adapted to send and to receive data in encrypted form,
the storage area is adapted to store data, and
the processing area is adapted to receive data from the storage area and/or from the network area, to process the data received, and to transmit the processed data to the storage area and/or to the network area.

Thereby, it can be ensured that on the one hand, data to be processed in the processing area exclusively is present in unencrypted form, and that on the other hand, the data outside the processing area exclusively is present in encrypted form.

The processing area may comprise at least one encryption and/or decryption means, wherein the encryption and/or decryption means is adapted to
decrypt the data received from the storage area and/or from the network area, and
to encrypt the data to be transmitted to the storage area and/or to the network area,
wherein the private keys required for decrypting the data exclusively are stored in the processing area such that the data outside the processing area is only available in encrypted form.

The processing area exclusively comprises volatile storage means which use their storage content immediately after an interruption of the power supply.

The processing area may be further adapted to carry out, during booting of the components of the processing area, a fingerprint comparison between a hardware fingerprint of the component and a software fingerprint of the software which is to start the component, and start the component only if the hardware fingerprint matches the software fingerprint.

The access control may comprise an access control unit and a number of sensor-/actor units coupled to the access control unit, wherein at least one sensor-/actor unit is assigned respectively to each one of the network area, the processing area, and the storage area, wherein each sensor-/actor unit has at least one sensor and/or actor, and wherein the access control unit is adapted to control the sensor-/actor units.

The at least one sensor and/or actor may be selected from the group comprising at least one of a grip control, a power switch, a rack sensor, a door sensor, and combinations thereof.

Each sensor-/actor unit, upon failure of the access control unit and/or upon a communications problem between the sensor-/actor unit and the axis control unit, may be adapted to bring the respective area into a predetermined state.

The access control unit may be coupled to a WORM storage means (write once read many) and may be further adapted to store the states and/or actions detected by the sensors and/or actors in the WORM storage means.

Further, a method for reliable processing of data in a system is provided, wherein
  the data to be processed is transmitted in encrypted form from the network area and/or from the storage area to the processing area of the system,
  the data transmitted to the processing area is decrypted in the processing area, wherein a private key is used for decrypting the data, which is storable in the processing area only,
  the decrypted data is processed in the processing area only,
  the processed data is encrypted in the processing area, and the encrypted data is transmitted to the network area and/or to the storage area.

The data is present in the system only in unencrypted form.

The private keys required for decrypting of the data preferably are generated within the processing area dynamically. Alternatively, they also may be generated by means of Forward Secrecy—methods.

It is advantageous, if only volatile storage means are used in the processing area, wherein the access control monitors accesses to the processing area and interrupts the power supply of the processing area upon detection of an unauthorized access such that the volatile storage means of the processing area lose their storage content. Because the data is only present in unencrypted form in the processing area, it is ensured that upon unauthorized access to the processing area, the data in the processing area is deleted and no unencrypted data remains outside the processing area.

The processing area may perform a fingerprint comparison between a hardware fingerprint of the component and a software fingerprint of the software, which is to start the component during booting of its components, and may only start the component, if the hardware fingerprint matches the software fingerprint.

BRIEF DESCRIPTION OF THE DRAWINGS

Details and features of the invention as well as concrete embodiments of the invention can be derived from the following description in connection with the drawing in which.

DETAILED DESCRIPTION

According to the invention, a data processing system is provided which is structured such that a separation of the units and areas, in which encrypted or unencrypted data is present is made.

Thereby, the method according to the invention and the system according to the invention have the advantage to achieve a substantial improvement of the data confidentiality with little effort, and at the same time, to reduce the organizational measures known from prior art such that the "human" factor is eliminated nearly completely. Thereby, the data may be processed "reliably". "Reliably" means that also the provider (or his employees) does not have access to unencrypted data in the system and that an access by the provider to unencrypted data in the system is excluded to a large extent.

The method according to the invention and the system according to the invention are based on the approach that the data processing system by means of technical measures ensures at any time that an access to data in unencrypted form is excluded.

Figure 1:
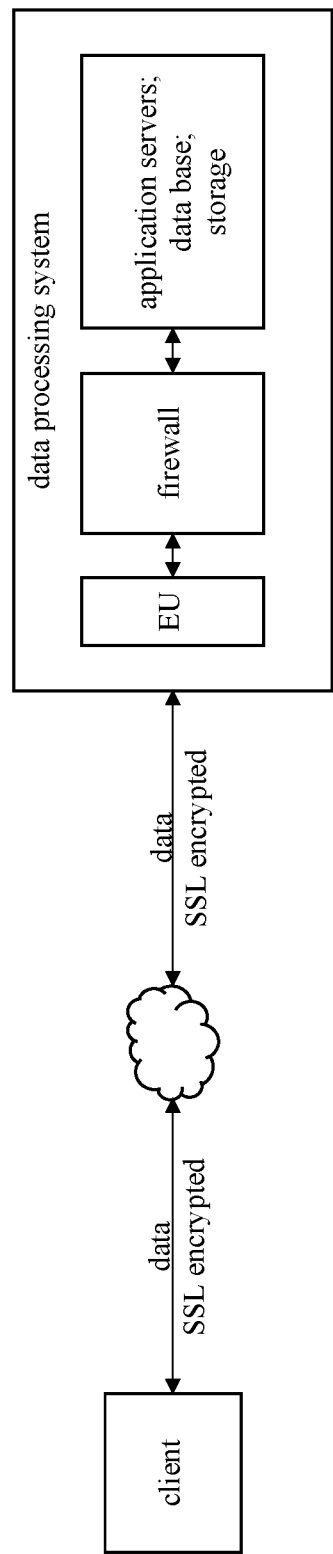
FIG. 1 is a system for processing data known from prior art.
Figure 2:
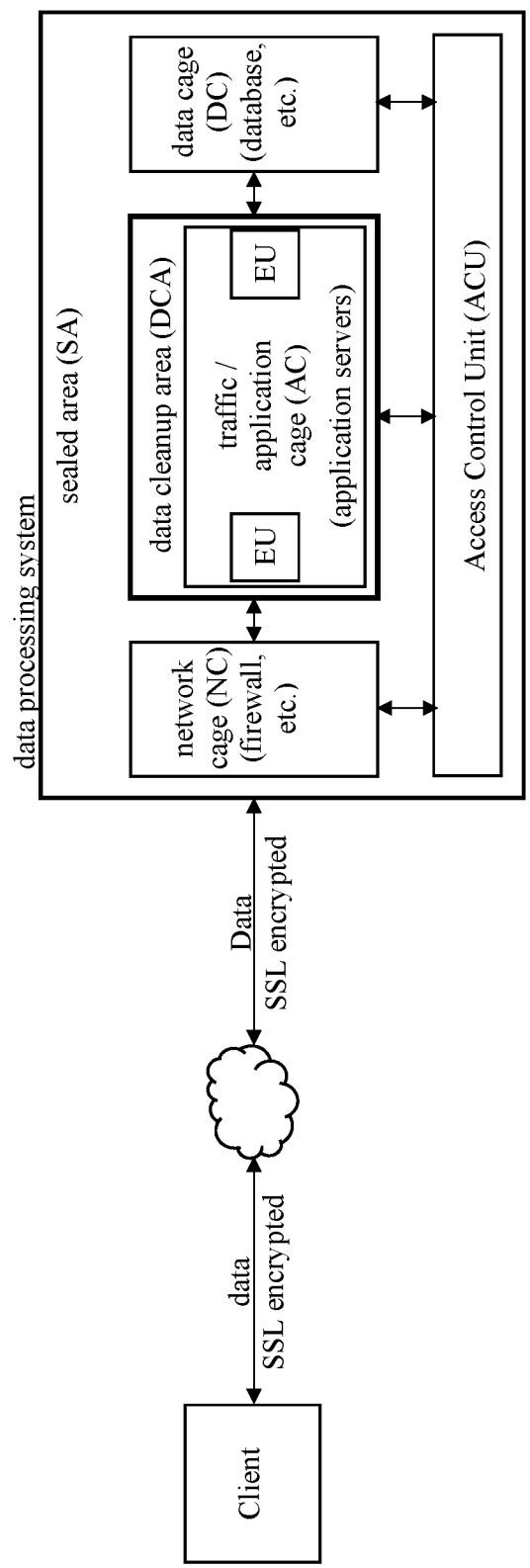
FIG. 2 is a block diagram of a system according to the invention for reliable processing of data.
Figure 3:
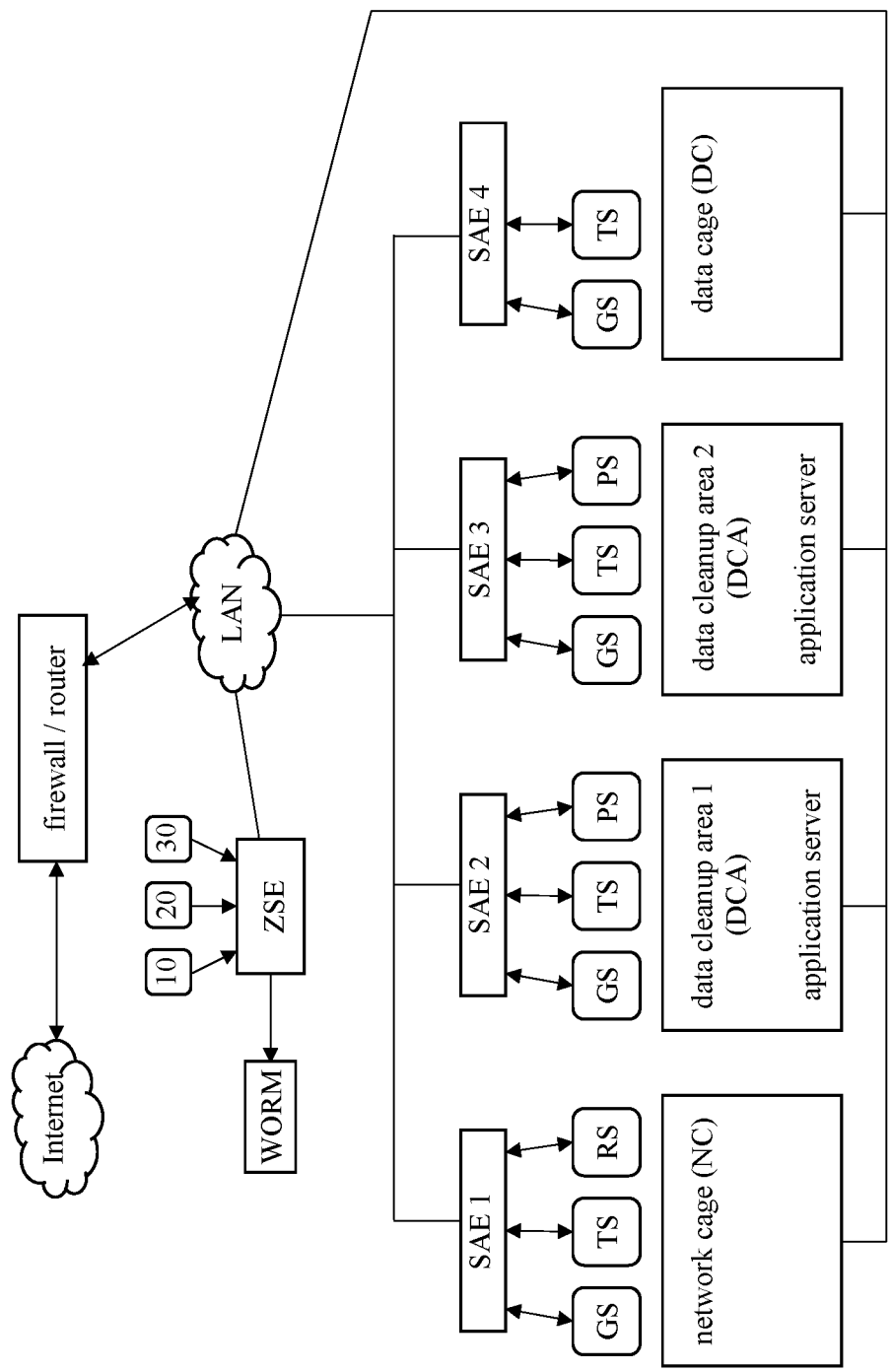
FIG. 3 is a concrete example of a system according to the invention for reliable processing of data.

FIG. 2 shows a block diagram of a data processing means structured according to the invention by means of which the data may be processed "reliably". According to the invention, thereby, the confidentiality of the data is also ensured with respect to attacks from "inside", namely, against attacks from the provider of the system. FIG. 3 shows a concrete example of a system according to the invention for reliable processing of data which is structured according to the form shown in FIG. 2.

In order to configure the system reliably, the following measures are provided, wherein these measures may be provided individually or may be combined with each other:
  providing of a "sealed area" SA with specific access control ACU;
  separating the functional units of the data processing system into network areas NC (network cage), processing areas AC (traffic/application cage) and storage areas DC (data cage); and
  providing specific areas DCA, in which the processing of unencrypted data takes place (data cleanup area).

In the following, the properties and the technical realization of the areas mentioned above is explained in detail with reference to FIG. 2 and FIG. 3. Hereby, the description is made by means of a data processing system, which consists of an electronics cabinet ("rack") with four sub-units ("cage"), as shown for example in FIG. 3. The example shown in FIG. 3 merely is to be understood as being an implementation example and does not represent any limitation to the system, in particular with respect to the size and scalability.

The entire data processing system is implemented within a "sealed area" SA. "sealed area" means s secured environment or a sealed infrastructure.

The data processing system is connected to the public Internet through a firewall and/or a router, wherein the required restrictive rules for the accessibility of internal components of the data processing means is ensured.

Internally, the components of the system, in particular, the network area NC, the processing areas AC and the data cleanup area DCA, respectively, and the storage area DC communicate via a private LAN (Local Area Network) or via another communications network suitable for this purpose. The processing areas AC, hereby, are located in the data cleanup areas, wherein several processing areas AC may be arranged. Several network areas NC and/or several storage areas DC may be provided.

The data cleanup area is configured according to the invention such that upon an unauthorized access to the data cleanup area all data stored there, in particular, the non-encrypted data stored, is deleted.

The network area NC, here, is coupled to the processing areas AC via a communications network. The storage area DC also is coupled to the processing areas AC via a communications network.

The processing area AC (or the processing areas) has at least one encryption unit EU. The encryption unit EU is provided in order to encrypt and/or decrypt the data traffic between the network area NC and the processing area AC, and between the storage area DC and the processing area AC. According to the invention, data is present in the processing areas AC exclusively in unencrypted form. Outside the processing areas AC, i.e., in the network area NC and in the storage area DC, the data is present in encrypted form only. Thereby, it is ensured that the data in the storage area DC and in the network area NC itself is almost completely useless for an attacker even upon compromising the storage area DC and/or the network area NC.

A further essential aspect of the invention, besides the structural implementation (separation of the data processing means into the areas network areas NC, processing areas AC, and storage areas DC), is the access control which together with the basic storage layout which will be described in further detail with reference to FIG. 4, ensures that in no case, namely, neither upon unauthorized intrusion into the system nor during maintenance activities, an access to unencrypted data is possible.

Basically, the access control comprises an access control unit ZSE which may be configured as central access control unit, and peripheral sensor-/actor units SAE. A sensor-/actor unit SAE may be assigned to each area (network areas NC, processing areas AC, and storage areas DC), as shown in FIG. 3.

Alternatively, a sensor-/actor unit SAE may also be assigned to several areas. Thus, a sensor-/actor unit SAE, for example, may also be assigned to several storage areas DC.

Each sensor-/actor unit SAE is coupled to at least one peripheral actor and sensor. With respect to the example shown in FIG. 3, the sensor-/actor units SAE 1 to SAE 4 are respectively coupled to at least two sensors or actors.

The sensors/actors, here, comprise grip controls GS including the mechanical and electro-mechanical components, door sensors TS, rack sensors RS and power switches PS connected thereto. The communication between a sensor-/actor unit SAE and the respective actors and/or sensors preferably is realized via a serial interface, e.g., a CAN bus.

The implementation of the sensor-/actor units SAE may be realized by means of commercially available microcontroller units. The access control unit ZSE may be realized by means of a commercially available server.

The access control unit ZSE controls, preferably centrally, the accesses to the components of the data processing system. Preferably, it implements also the logic for control of the sensor-/actor units SAE and the sensors/actors coupled thereto, thereby monitoring the status of the data processing system and implementing the access authorizations.

The operating states of the data processing system and/or the actions of the actors are recorded and, on the one hand, may be documented in a, preferably forensic, storage, and, on the other hand, may be transmitted to a control point, thereby notifying necessary notifications to the maintenance staff, and if needed, initiating necessary activities. As storage for storing the sensor data and/or activities, preferably, a WORM storage (write once read many) is provided.

Moreover, optical and acoustical outputs as well as the possibility for evaluating video data are provided. For this purpose, the access control unit ZSE may be coupled to a video camera 20 and/or to optical and/or acoustical alarm indicators 30.

The approval of accesses to the individual areas, here, is initiated by approval tickets. The approval tickets may be transmitted from a mobile terminal 10 to the access control unit ZSE. Preferably, the transmission of the approval ticket is realized via a Bluetooth interface.

As mentioned above, a sensor-/actor unit SAE may be provided for every area (as shown in FIG. 3). Sensor-/actor units SAE represent an interface between the access control unit ZSE (if needed, central) and the actors and/or sensors GS, TS, RS, PS. The sensor-/actor units SAE are respectively adapted to ensure autonomously that in case of failure of the access control unit ZSE or upon communications problems between the sensor-/actor unit SAE and the access control unit ZSE, the areas concerned are switched into a predetermined, safety-wise predefined, or predetermined safe state.

The grip controls GS are used for opening and closing of doors of the single areas as well as for operating the related locks. The locks of the grip controls GS do not comprise classical authentication mechanisms, as lock barrels or numerical input fields, but rather are controlled exclusively via release and closing instructions of the access control unit ZSE. The statuses of the grip controls GS "release lock and grip closed", "release lock and grip opened", "lock locked and grip closed", and "lock locked and grip opened" are detected via corresponding sensors, and are notified to the access control unit ZSE which may evaluate the latter in a suitable manner.

The status "lock closed and grip opened" typically indicates an unauthorized, forced access and may be used, for example, for the activation of the corresponding area.

The door sensors TS are used for indication of the door statuses "open" and "closed". They may, for example, be based on mechanical, magnetic, or infrared methods. Together with other sensors, system states may be determined and suitable actions, if needed, may be initiated. For example, the state "grip closed" and "door is opened" represents an unauthorized access.

The rack sensors RS, at first, may be used in the same manner as door sensors TS for recognizing, for example, an unauthorized demounting of rack parts (side parts, cover, and so on). Moreover, further sensors, for example, acceleration sensors, may be employed in order to detect, for example, vandalism or non-authorized handling at the system, or to signalize the introduction of invasive objects etc. by infrared sections.

A substantial component of the system according to the invention is the power switches PS. The power switches PS are provided for supplying power to individual components, a complete rack, or an entire area or to switch the latter off. According to the invention, the power switches PS are adapted such that upon an interruption of the signaling to the related sensor-/actor unit SAE, they switch the respective component into the state "without power". Thus, upon an interruption of the signaling, for example, the power supply for the entire area may be interrupted.

According to the invention, at least each data cleanup area DCA for each processing area AC is provided with an own power switch PS. Thereby, several processing areas AC may be realized, which may be switched independently from each other to "without power". For example, two processing areas AC may be provided, wherein one of the two processing areas AC serves as backup for the respective other processing area AC. In case either one of the two processing areas AC is compromised, it may be switched off, and the other processing area AC may take over the task of the compromised processing area AC. Thereby, the failure security, in particular, with respect to an attack from inside, is increased—the whole system, thereby, remains usable after an attack on a processing area AC. This also applies to the two other areas NC and DC.

A further substantial feature of a reliable system according to the invention is the use of the storage systems in the respective areas DCA, DC, and NC. This is described in further detail with reference to FIG. 4.

Figure 4:
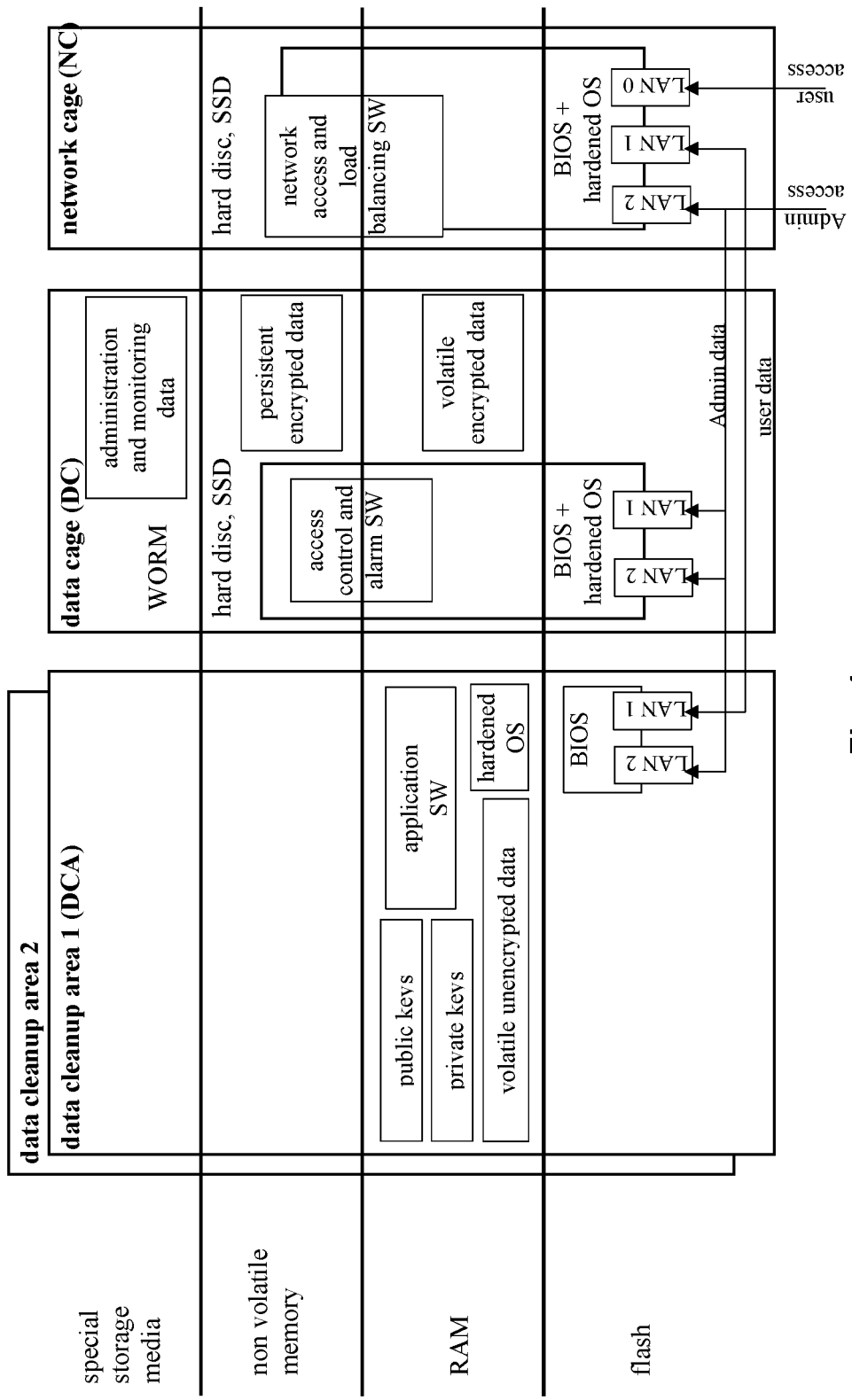
FIG. 4 are the storage systems used in the system according to the invention in the respective areas.

FIG. 4 shows the storage systems used in a system according to the invention in the respective areas.

Here, the four areas storage area DC, network area NC, and two data cleanup areas DCA are shown schematically. In the horizontal layers, it is shown schematically, which storage media or storage systems are used for the respective functional units according to the invention.

In the network area NC, there are located all components, which are necessary for communication to the outside, for example with a client. Moreover, besides a logical separation, also a physical separation of networks, via which user data is transmitted, from networks, which are used for administrative tasks, is advantageous. Thereby, in particular, a distinct separation of access possibilities can be ensured.

All components comprise a hardened operating system OS, which only admits the interfaces, which are necessary for the respective implementation. In the example shown in FIG. 4, only the network interfaces LAN 0, LAN 1, and LAN 2 are admitted. Other interfaces (e.g., USB) are switched into inactive, and preferably may neither be activated. This allows for the implementation of standardized hardware components, without having to sacrifice the data security by doing so.

The operating system OS, during operation of the system, is located within flash- and the HDD/SSD memories, as well as in the RAM. The software specific to the network area, for example, for the load balancing and for the network management, is located within the HDD/SSD and in the RAM areas.

For the invention, it is essential that the network area NC represents a pure "transfer unit" with respect to the user data, i.e., encrypted user data is not decrypted in the network area NC, and due to lack of knowledge of the private key required for this, may not be decrypted either.

In the data cleanup areas DCA or in the processing areas AC, the actual processing of the user data is carried out by means of the application software.

The encrypted data arriving from the network area NC is decrypted in the respective data cleanup area DCA or in the respective processing area AC, and is encrypted again prior to the transmission to the network area NC. By a suitable key management, it is ensured that the keys necessary for the en- and decryption (public keys for encrypting and private keys for decrypting) are only present in the data cleanup area DCA or in the processing area AC unencrypted.

By analogy, the same as outlined above for the en- and decrypting also applies for data, which is transmitted between the storage area DC and the processing area AC.

Unencrypted data, thereby, is only present in the processing area AC or in the data cleanup area DCA.

According to the invention, the processing area AC or the data cleanup area DCA is particularly characterized in that no persistent storage media are present. By this measure, the interruption of the power supply of the data cleanup area DCA or the processing area AC achieves that no unencrypted data may leave the data cleanup area DCA or the processing area AC, and
 data no longer is present in the data cleanup area DCA or in the processing area AC, because only volatile storage types or storage media are employed.

Components used in the data cleanup area DCA, on the software-side, only comprise a boot/netboot software allowing to load the operating system and the application software from the network area NC.

In order to ensure that upon manipulation, for example, during maintenance work, persistent memories are introduced, thereby levering the security concept, during booting (starting or booting) of the components of the data cleanup area DCA, a fingerprint comparison is performed respectively, according to which a fingerprint of the software to be loaded is compared to a fingerprint of the apparatus to be loaded by means of this software. In case a hardware component, for example, has been manipulated, the fingerprint of this hardware component would no longer match to the fingerprint of the software such that this hardware component is not loaded. Such a state may be notified to the maintenance staff. Additionally or alternatively, in such a case, also booting of the entire data cleanup area DCA is prevented.

Further, in the data cleanup area DCA, a hardened operating system OS is employed. The hardened operating system is adapted to prevent the use of persistent storage media.

In order to avoid that, for example, unencrypted data is read by logical accesses via the network (e.g., ssh-Login), logical accesses (e.g. ssh-Login) to the server in the data cleanup area DCA are prevented in general.

With respect to the operating system and the physical interfaces, the above is applicable correspondingly for the storage area DC and for the network area NC. In the storage area DC, data base and bulk storage are accommodated, which only comprise encrypted data according to the concept. According to an embodiment of the invention, the storage area DC may also store the data of the access control unit ZSE.

According to the invention, the procedure for authorized accesses, as during maintenance work, will be realized as outlined in the following:

An access ticket which either is temporally restricted and/or is issued for one or more areas, is generated or created by means of a suitable method. Subsequently, the generated access ticket is transmitted to a terminal, as a mobile terminal, of the maintenance engineer in charge. The access ticket may be transmitted in an encrypted manner and, for example, may only be decrypted with a private key of the maintenance engineer in charge. Thereby, it is avoided that an intercepted access ticket is misused. The maintenance engineer in charge transmits the access ticket to the access control unit ZSE. The access control unit ZSE recognizes on the basis of the data transmitted the validity of the ticket. The starting point of time for the validity period may be, for example, the transmission time, at which the ticket is transmitted to the access control unit ZSE. The transmission of the ticket to the access control unit ZSE may be accomplished, for example, by means of Bluetooth. By a corresponding real-time clock and suitable software, this method even works, if the access control unit ZSE is not connected to the public net.

After a successful evaluation or verification of the ticket received, the access control unit ZSE instructs the corresponding grip control GS to open the corresponding door such that a physical access to the respective area is possible. After the closing of the corresponding door, an automatic locking is carried out.

It is advantageous, if after transmission to the access control unit ZSE, the ticket is invalid, and thus, cannot be used a second time.

In case that access to the data cleanup area DCA or to the processing area AC is desired, according to the invention, prior to release of the lock by the grip control GS, the data cleanup area DCA or the processing area AC is switched off, i.e., the power supply of all components (server, etc.) of the data cleanup area DCA or the processing area AC is interrupted. The release of the lock by the grip control GS is only effected after a predetermined time duration after the interruption of the power supply. The predetermined time period is to be selected such that it is ensured that the data which is present in the volatiles storage systems of the data cleanup area DCA or the processing area AC cannot be used any more. For example, the predetermined time duration may be 15 seconds or more. Depending on the type of volatile storage system used, the predetermined time duration may also be less than 15 seconds.

Thereby, it is ensured that also an authorized person (as a maintenance employee) is not able to access unencrypted data.

The accesses to the network area NC and to the storage area DC are controlled as described with reference to the data cleanup area DCA or the processing area AC. However, hereby, it is not compulsory to carry out an interruption of the power supply, because the data anyway is present in encrypted form.

A non-authorized access (for example, during violent breaking of doors, demounting of side walls, etc.) is recognized by the sensors, is recorded, and is notified to a control center. In case, the data cleanup area DCA or the processing area AC is affected by this, the interruption of the power supply is initiated automatically and immediately.

Above, the invention has been described by means of an example, according to which the data processing system has four areas, namely, a storage area DC, a network area NC, and two processing areas AC, or two data cleanup areas DCA-However, the invention may be applied to various realizations. Thus, the number of areas is not restricted to four, but rather may be extended arbitrarily. For example, several storage areas DC, several network areas NC, and several processing areas AC or data cleanup areas DCA may be provided. Scaling up is always possible. When scaling down, it has to be taken into consideration that at least three independent areas are present, namely, a storage area DC, a network area NC, and a processing area AC or a data cleanup area DCA.

In summary, the reliable data processing means described above is characterized by the following technical features:

sealed area SA with specific access control by means of an access control unit ZSE, one or more sensor-/actor units SAE, and a number of sensors/actors per sensor-/actor unit SAE;

separation of the functional units data cleanup area DCA or processing area AC, network area NC, and storage area DC;

performing a data cleanup (i.e., deleting the data in the volatile storage media by interruption of the power supply) upon authorized and non-authorized accesses;

the storage layout used by all system components, in particular, the use of exclusively volatile storage media in the data cleanup area DCA or in the processing area AC;

hardened operating systems OS;

key management and encryption of the data upon leaving the data cleanup area DCA or the processing area AC;

monitoring and reporting/storage of the operating states;

locks GS controlled by means of tickets;

fail—save upon failure of components or manipulation hardware/software-fingerprint-check upon start-up of the components of the data cleanup area DCA or the processing area AC.

REFERENCE NUMERALS mobile terminal (e.g., mobile phone of the maintenance technician)
video camera
optical and acoustical alarm indicators
AC application cage (processing area)
ACU access control unit
DC data cage (storage area)
DCA data cleanup area
EU encryption unit (en- and decryption of data)
GS grip control
NC network cage (network area)
PS powers switches (power switch)
RS rack sensors
SA sealed area
SAE sensor-/actor units
TS door sensors
ZSE access control unit

The invention claimed is:

1. A system for reliable data processing, wherein the system is implemented in a sealed infrastructure, wherein the sealed infrastructure comprises:

a network area, at least one processing area, and a storage area, wherein the network area, the processing area, and the storage area are separated from each other physically, wherein the network area and the processing area as well as the processing area and the storage area are coupled to each other via an internal communications network, an access control being configured to monitor and to control an access to the network area, the processing area, and the storage area, and to prevent an access to unencrypted data, and a mobile terminal, and wherein the network area is configured to handle a communication between the system and an external system via a communications network, wherein the network area is further configured to send and to receive data in encrypted form, the storage area is configured to store data, and the processing area is configured to receive data from the storage area and/or from the network area, to process the data received, and to transmit the processed data to the storage area and/or to the network area, and wherein the processing area comprises at least one encrypting and/or decrypting means, wherein the encrypting and/or decrypting means is configured to decrypt the data received from the storage area and/or from the network area, and encrypt the data transmitted to the storage area and/or to the network area, wherein the processing area exclusively comprises volatile storage means which lose their stored content immediately after an interruption of a power supply, wherein private keys required for decrypting the data are stored only in the processing area such that the data outside the processing area is only available in encrypted form, wherein the access control comprises an access control unit and a number of sensor units and/or actor units coupled to the access control unit, wherein at least one sensor unit and/or actor unit is assigned to each network area, processing area, and storage area, wherein each sensor unit and/or actor unit comprises at least one sensor and/or actor, and wherein the access control unit is configured to control the sensor units and/or actor units, wherein the mobile terminal is configured to transmit a temporally restricted access ticket to the access control unit, wherein the access ticket is transmitted in an encrypted manner to the mobile terminal and cannot be used a second time after transmission to the access control unit, and wherein the access control unit verifies the validity of the access ticket, and wherein the power supply of the processing area is interrupted after a successful verification of the access ticket, if access to the processing area is desired.

2. The system of claim 1, wherein the processing area further is configured to perform, for each component, a fingerprint comparison between a hardware fingerprint of the component and a software fingerprint of software, which is to start the component during booting of the components of the processing area, and to only start the component, if the hardware fingerprint matches the software fingerprint.

3. The system of claim 1, wherein the at least one sensor and/or actor is selected from the group comprising at least a grip control, a power switch, a rack sensor, a door sensor, or combinations thereof.

4. The system of claim 1, wherein each sensor unit and/or actor unit, upon failure of the access control unit and/or upon a communications problem between the sensor unit and/or actor unit and the access control unit, is configured to bring the respective area into a predetermined state.

5. The system of claim 1, wherein the access control unit is coupled to a WORM storage means, and is further configured to store states and/or actions detected by the sensors and/or actors in the WORM storage means.

6. A method for reliable processing of data in a system according to any one of the preceding claims, wherein the data to be processed is transmitted from the network area and/or from the storage area to the processing area of the system in encrypted form, the data transmitted to the processing area is decrypted in the processing area, wherein for decrypting the data, a private key is used being exclusively storable in the processing area, the decrypted data is processed exclusively in the processing area, the processed data is encrypted in the processing area, and the encrypted data is transmitted to the network area and/or to the storage area.

7. The method of claim 6, wherein volatile storage means are used in the processing area exclusively, wherein the access control monitors accesses to the processing area and upon a detection of an unauthorized access, interrupts a power supply of the processing area, such that the volatile storage means of the processing area lose their storage content.

8. The method of claim 6, wherein the processing area for each component performs a fingerprint comparison between a hardware fingerprint of the component and a software fingerprint of software, which is to start the component during booting of its component, and the component only starts, if the hardware fingerprint matches the software fingerprint.

* * * * *